Patented May 10, 1932

1,857,250

UNITED STATES PATENT OFFICE

THEODOR MEISSNER, HANS HEYNA, AND ERNST FISCHER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFFS OF THE THIONAPHTHENE-INDOLINDIGO SERIES

No Drawing. Application filed August 20, 1930, Serial No. 476,722, and in Germany September 25, 1929.

The present invention relates to vat-dyestuffs of the thionaphthene-indolindigo series.

We have found that vat dyestuffs of the following general formula:

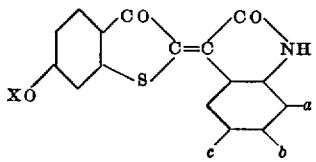

wherein X stands for an alkyl group of low molecular weight, $a$ for halogen or an alkyl group of low molecular weight and $b$ and $c$ stand for hydrogen, halogen or an alkyl group of low molecular weight, dyeing very fast clear orange tints, are obtainable by condensation of 6-alkoxy-3-hydroxy-1-thionaphthene with substituted isatins of the following formula:

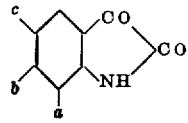

wherein $a$ stands for halogen or an alkyl group of low molecular weight, $b$ and $c$ stand for halogen, an alkyl group of low molecular weight or hydrogen. The dyeings are distinguished by pure tints and a good fastness to light, which partly comes up to the fastness of light of the valuable vat dyestuffs of the anthraquinone series, dyeing orange tints. The new dyestuffs are well suited for being used in the cloth printing.

The condensation may be carried out according to one of the usual methods, known in the art.

The following examples serve to illustrate the invention, but they are not intended to limit it thereto, the parts are by weight:

(1) 18 parts of 6-methoxy-3-hydroxythionaphthene are dissolved while heating in 200 parts of glacial acetic acid or acetic acid anhydride and mixed with a solution of 22 parts of 5.7-dichlor-isatin in 200 parts of glacial acetic acid. After addition of a small quantity of concentrated hydrochloric acid, the 6-methoxy-2-thionaphthene-5'.7'-dichloro-3'-indolindigo precipitates from the hot solution in the form of crystals. The whole is stirred for a short time on the steam bath until the formation of the dyestuff is finished. The solution is allowed to cool and the dyestuff is filtered with suction, washed first with glacial acetic acid and subsequently with water. It dyes the fiber from a yellow vat clear orange tints of good fastness to washing, to boiling and to light.

(2) By replacing in Example 1 the 6-methoxy-3-hydroxythionaphthene by 19,4 parts of 6-ethoxy-3-hydroxythionaphthene and proceeding in the manner indicated in that example, the 6-ethoxy-2-thionaphthene-5'.7'-dichloro-3'-indolindigo is obtained, which dyes the fiber from a yellow vat clear orange tints having fastness properties similar to those of the dyeings of the dyestuff obtainable according to Example 1.

(3) 19,6 parts of 6-chloro-7-methylisatin are dissolved in 200 parts of hot glacial acetic acid and mixed with a warm solution of 18 parts of 6-methoxy-3-hydroxythionaphthene in 200 parts of glacial acetic acid. After addition of a small quantity of concentrated hydrochloric acid, the 6-methoxy-2-thionaphthene-6'-chloro-7'-methyl-3'-indolindigo precipitates from the solution in a crystalline state; heating is continued for a short time at steam bath temperature. After cooling, the dyestuff is filtered with suction and worked up as usual. It dyes the fiber from a yellow vat orange tints having a much more yellow hue than the dyeings of the dyestuffs obtainable according to Examples 1 and 2, and a more yellow hue than the dyeing obtained from the 6.6'-dimethoxythioindigo. The dyeings of the 6-methoxy-2-thionaphthene-6'-chloro-7'-methyl-3'-indolindigo have good fastness properties; they have an excellent fastness to light.

(4) By replacing in Example 3 the 6-methoxy-3-hydroxythionaphthene by 19,4 parts of 6-ethoxy-3-hydroxythionaphthene and by proceeding as indicated in that example, the 6-ethoxy-2-thionaphthene-6'-chloro-7'-methyl-3'-indolindigo is obtained which dyes the fiber from a yellow vat orange tints having a more yellow hue than those of the dyestuff obtained according to Example 3. The 6-ethoxy-2-thionaphthene-6'-chloro-7'-methyl-3'-indolindigo has the same fastness properties as the dyestuff obtained according to Example 3.

(5) 19,4 parts of 6-ethoxy-3-hydroxythionaphthene are dissolved in about 200 parts of hot glacial acetic acid and mixed with a solution of 18,2 parts of 7-chlorisatin in 200 parts of glacial acetic acid. After heating for a short time and adding a small quantity of concentrated hydrochloric acid, the 6-ethoxy-2-thionaphthene-7'-chloro-3'-indolindigo precipitates in a crystalline state. It is worked up in the usual manner. It dyes the fiber from a yellow vat orange tints which are particularly distinguished by a very good fastness to light.

(6) 18 parts of 6-methoxy-3-hydroxythionaphthene are dissolved in about 200 parts of glacial acetic acid and subsequently mixed with a warm solution of 19,6 parts of 5-methyl-7-chlor-isatin in about 200 parts of glacial acetic acid. After addition of a small quantity of concentrated hydrochloric acid, the 6-methoxy-2-thionaphthene-5'-methyl-7'-chloro-3'-indolindigo precipitates at once in a crystalline state. It is worked up in the usual manner. It dyes the fiber from a yellow vat orange tints, having a redder and more intense hue than those of the dyestuff obtained according to Example 1.

(7) 18 parts of 6-methoxy-3-hydroxythionaphthene and 30,5 parts of 5,7-dibromisatin in about 600 parts of alcohol are heated on the steam bath while stirring and cooling in the reflux apparatus. After addition of a small quantity of concentrated hydrochloric acid, the 6-methoxy-2-thionaphthene-5'7'-dibrom-3'-indolindigo precipitates at once in a crystalline state. Heating is continued for some time, until the formation of the dyestuff is finished. It is filtered with suction, washed with warm alcohol and dried. The dyestuff dissolves in concentrated sulfuric acid with a reddish-violet coloration and dyes the fiber from a yellow vat orange tints having fastness properties similar to those of the dyeings of the dyestuff obtainable according to Example 1.

We claim:

1. As new products, the compounds of the following general formula:

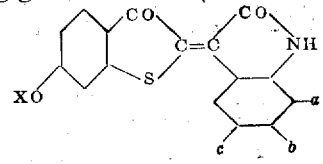

wherein X stands for an alkyl group of low molecular weight, a for halogen or an alkyl group of low molecular weight and b and c stand for hydrogen, halogen or an alkyl group of low molecular weight, dyeing cotton clear orange tints of good fastness to light.

2. As new products the compounds of the following general formula:

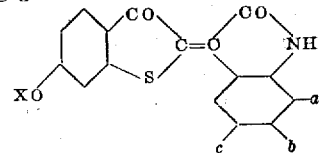

wherein X stands for methyl or ethyl, a for chlorine, bromine or methyl and b and c stand for chlorine, bromine, methyl, or hydrogen, dyeing cotton clear orange tints of good fastness to light.

3. As new products, the compounds of the following general formula:

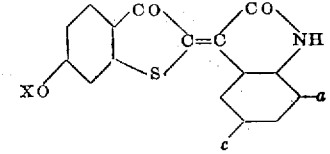

wherein X stands for methyl or ethyl, a for chlorine, bromine or methyl, b for hydrogen, bromine or chlorine and c for hydrogen, bromine, chlorine or methyl, dyeing cotton clear orange tints of good fastness to light.

4. As new products, the compounds of the following general formula:

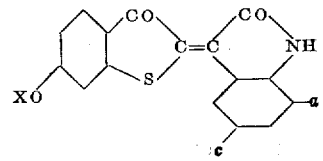

wherein X stands for methyl or ethyl, a for chlorine, bromine or methyl and c for chlorine, bromine, methyl or hydrogen, dyeing cotton clear orange tints of good fastness to light.

5. As new products, the compounds of the following general formula:

wherein X stands for methyl or ethyl, a for chlorine, bromine or methyl and c for hydrogen, chlorine or bromine, dyeing cotton clear orange tints of good fastness to light.

6. As a new product, the 6-methoxy-2-thionaphthene-5'7'-dichloro-3'-indolindigo dyeing cotton from a yellow vat clear orange tints of good fastness to washing, boiling and to light.

7. As a new product, the 6-methoxy-2-thionaphthene-5'7'-dichloro-3'-indolindigo dyeing cotton from a yellow vat clear orange tints of good fastness to washing, boiling and to light.

8. As a new product, the 6-methoxy-2-thionaphthene-5'-methyl-7',chloro-3'-indol-indigo dyeing cotton from a yellow vat clear orange tints of good fastness to washing, boiling and to light.

In testimony whereof, we affix our signatures.

THEODOR MEISSNER.
HANS HEYNA.
ERNST FISCHER.